United States Patent Office 3,451,139
Patented June 24, 1969

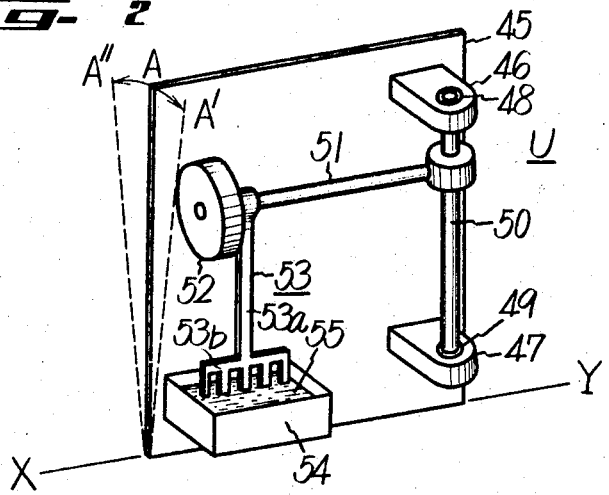
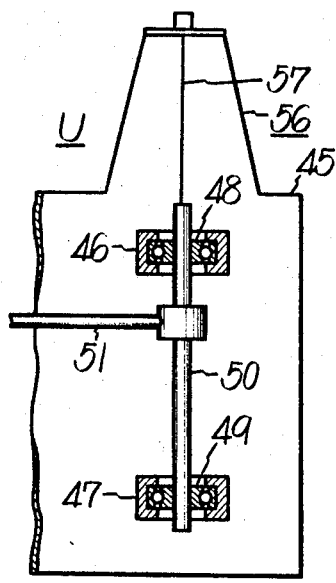
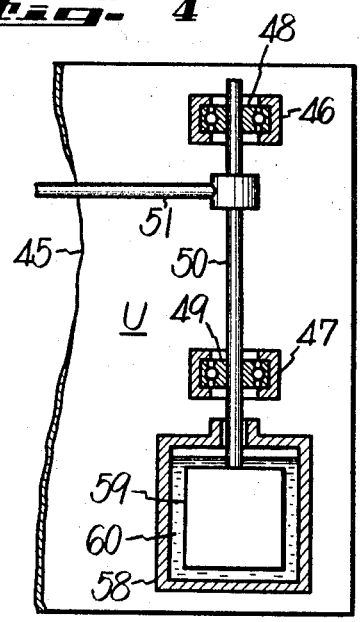

3,451,139
GYROCOMPASS
Shin-ichi Kawada, Yokohama-shi, Japan, assignor to Kabushikikaisha Tokyo Keiki Seizosho (Tokyo Keiki Seizosho Co., Ltd.), Tokyo, Japan
Original application June 18, 1964, Ser. No. 376,020, now Patent No. 3,321,841, dated May 30, 1967. Divided and this application Mar. 30, 1967, Ser. No. 627,143
Claims priority, application Japan, June 19, 1963, 38/32,220
Int. Cl. G01c 19/38
U.S. Cl. 33—226                                          4 Claims

ABSTRACT OF THE DISCLOSURE

A gyrocompass having an integral torque generator rotatably mounted on a conventional gyro in accordance with movement of the gyro, said integral generator including a vertical shaft rotatable around its axis, a support arm provided with a weight and a damper means so as to produce a torque with respect to time for eliminating errors such, for example, a latitudinal error caused by the earth rotation and an error caused by mass unbalance of a gyro about the horizontal axis thereof according to change of temperature and/or the like.

---

This application is a division of my application Ser. No. 376,020, filed June 18, 1964, now Patent No. 3,321,841.

BACKGROUND OF THE INVENTION

*Field of the invention*

The present invention relates to a gyrocompass having an element for eliminating errors such, for example, as a latitudinal error caused by the earth rotation and an error caused by mass unbalance of a gyro about the horizontal axis thereof according to change of temperature and/or the like.

*Description of the prior art*

A conventional gyrocompass has defects, for example, a latitudinal error caused by the earth rotation and an error caused by mass unbalance of a gyro about the horizontal axis thereof according to change of temperature and/or the like. Accordingly, there inevitably occurs an error in north seeking action of the conventional gyrocompass in accordance with the latitudinal error and the like.

SUMMARY OF THE INVENTION

The present invention relates to a gyrocompass including an integral torque generator in addition to conventional gyrocompass elements. According to the operation of the integral torque generator of the present invention defects such, for example, as a latitudinal error caused by the earth rotation and an error caused by mass unbalance of gyro about the horizontal axis thereof can be substantially eliminated.

BRIEF DESCRIPTION OF THE DRAWINGS

FIGURE 2 is a schematic diagram showing an example of an integral torque generator according to the present invention;

FIGURES 3 and 4 are schematic diagrams of the other integral torque generators of the present invention each illustrating one portion of the integral torque generators;

DESCRIPTION OF THE PREFERRED EMBODIMENT

Before entering into the explanation of the present invention in detail, a conventional type gyrocompass will hereinbelow be explained simply which is provided with a mercury ballistic or a liquid ballistic (hereinafter referred to as a ballistic) and a device which applies a torque about a vertical axis of the gyrocompass in proportion to gyro inclination.

In all the conventional type gyrocompasses, their gyro-spin axes are not correctly horizontal with respect to the surface of the earth when the gyrocompasses set still pointing substantially to the north, and in northern hemisphere their north-side ends of spin axes are a little higher than the south-side ones. In the conventional type compass provided with the ballistic, the liquid of the ballistic flows to a pot of the south side which is lower than the north side and accordingly the south side becomes a little heavier than the north side, thereby producing a torque around a horizontal axis crossing the spin axis of the gyro at the right angle. With this torque, the gyro causes a precession around the vertical axis thereof. The angular velocity of the precession coincides with an angular velocity around the vertical axis of the surface of the earth at that place and the surface of the earth and the gyro rotate together, so that the gyro is regarded to stand still, pointing substantially to the north, with respect to the surface of the earth. That is, in the conventional type gyrocompass the inclination of the gyro spin axis from the horizontal level differs in accordance with the location of the gyrocompass and this inclination depends upon only the latitude of the loaction, and the spin axis is horizontal at the equator and the south side thereof becomes higher than the north side in the southern hemisphere.

As a damping system for making a gyro stationary toward the north, there is employed a method to apply a torque about a vertical axis in proportion to gyro inclination. According to this method, however, the position that the gyro inclines becomes a stationary point except at the equator, and hence a damping torque produced about the vertical axis remains at the stationary point. As a result of this, the gyro axis does not point to the due north, producing an error. This error is related only to the latitude in its nature, more correctly, it is proportional to the tangent of latitude and it has long been referred to as a latitudinal error.

Figure 1:
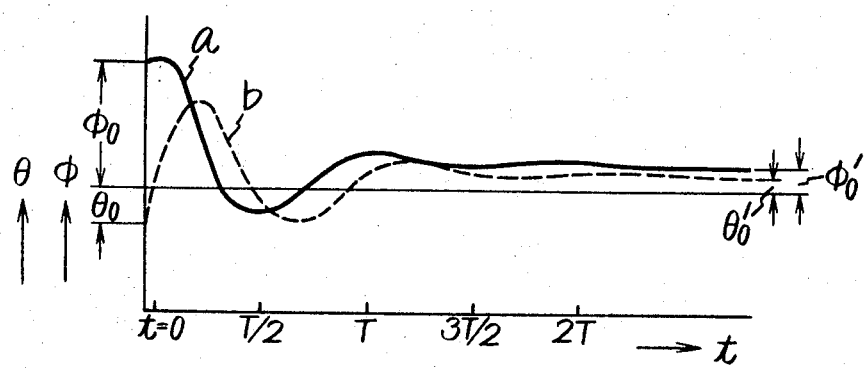
FIGURE 1 is a graph for explaining the north-seeking action of a gyrocompass heretofore employed.
Figure 6:
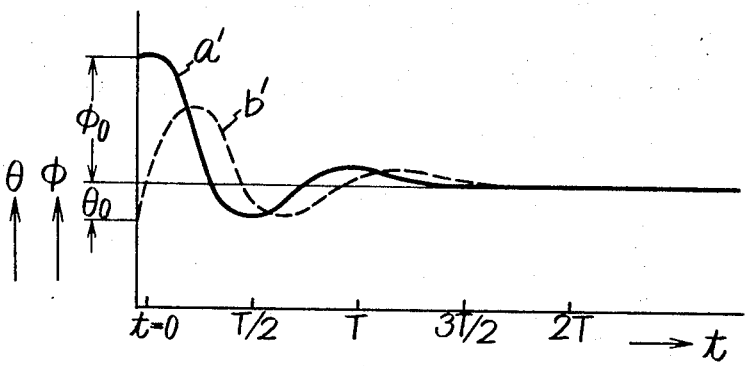
FIGURE 6 is a graph, similar to FIGURE 1, for explaining the north-seeking action of a gyrocompass of the present invention.

If now a conventional gyrocompass is started from a position that its gyro spin axis tilts toward the east by an angle $\phi_0$ from the north and its north side lies lower an angle $\theta_0$ than the south side, the spin axis performs damped oscillation as shown by the azimuthal curves $a$ and $b$ in FIGURE 1 due to the action of a ballistic and a damping device and then comes to a standstill at a position that the north side of the axis is higher than the south side by $\theta_0'$, producing an error (at latitudinal error) of $\phi_0'$ in azimuth. In FIGURE 1, the abscissa expresses time $t$ in unit time T and the ordinate expresses an azimuth $\phi$(the east) and angle of inclination $\theta$(the north).

In this kind of gyrocompasses, errors are produced even by transfer of the center of gravity which is caused due to temperature rise of the gyro and the like and with the lapse of time. This is because of the fact that when the gyrocompass comes to a standstill toward the north, precession around its vertical axis coincides with the rotary component around the vertical axis of the earth at a place where the gyrocompass is located for the reasons described above and a torque must be produced from a ballistic for eliminating a torque around the horizontal axis of the gyrocompass and, as a result of this, gyro-inclination becomes different at the stationary point. For the same reasons, all the inherent torque produced the horizontal axis cause constant errors.

In view of the foregoing disadvantages, the present invention is to provide means for obtaining highly efficient gyrocompasses without accompanying the errors.

In FIGURE, 2, an integral torque generator according to the present invention is generally indicated at a reference U. In this example, support bases 46 and 47 are provided on a base plate 45 and ball bearings 48 and 49 are fitted in the support bases 46 and 47 thereby to support a shaft 50 rotatably. To the shaft 50 a support arm 51 is fixed. A counter-weight 52 is fixed to the free end of the support arm 51 and a damper means 53 is fixed to the support arm 51. The damper means 53 consist of a rod 53a one end of which is attached to the support arm 51 and the other end of which has attached thereto a comb 53b and a box 54 containing a viscous liquid 55. The comb 53b of the damper means 53 is inserted into the viscous liquid 55. The portion including the shaft 50, the support arm 51, the counter-weight 52 and the damper means 53 is only in contact with the ball bearings and the viscous liquid 55 without directly contacting both the base plate 45 and the box 54.

When the base plate 45 is attached to the case plate 45' of a gyro case 5 (in FIGURE 5) and if the shaft 50 is directed to gravity only, the counter-weight 52 does not produce any torque large enough to rotate the shaft 50. If now the base plate 45 is rotated about the horizontal axis X–Y, namely its one side OA is inclined to be OA' or OA", as indicated at dotted lines in the figure, the counter-weight 52 produces a torque around the shaft 50. This torque is opposite in direction with each other according to the respective case where the base plate 45 inclined to the side OA' from the side OA or inclined to the side OA" from the side OA. Since the comb 53 of the damper means 53 is inserted into the highly viscous liquid 55, the rotating speed of the counter-weight 52 around the shaft 50 becomes proportionate to an angle of inclination of the side OA from its initial position. At the same time, change of the center of gravity of the integral torque generator U in FIGURE 2 corresponds to the inclination.

Therefore, in the case where the integral torque generator U shown in FIGURE 2 is fixed to the gyro case or one portion of its support member, if the gyro-spin axis is horizontal the shaft 50 is vertical and accordingly the support arm 51 crosses the spin axis substantially at the right angle, the integral torque generator U in FIGURE 2 can exactly eliminate the constant errors produced in the conventional gyrocompass, which will be understood from the foregoing description and latter description in connection therewith.

The integral torque generator illustrated in FIGURE 2 can be generally explained as follows:

A member is journalled on the vertical shaft 50 at its one side and the other part thereof is immersed into a viscous liquid. If the vertical shaft 50 inclines with respect to its vertical position, the member is rotated about the shaft 50, which causes the transfer of the center of gravity of the member.

FIGURES 3 and 4 illustrate improvements of the integral torque generator shown in FIGURE 2, each showing merely some portions around the shaft 50 of the integral torque generator shown in FIGURE 2. In FIGURE 3 a support base 56 is provided on the upper portion a base plate 45, from which is suspended a suspension wire 57 such as a piano wire or the like. The suspension wire 57 is fixed to the shaft 50 exactly along the extension axis of the shaft 50, by which no trust load is produced in bearings 48 and 49 to extremely reduce friction of the ball bearings 48 and 49, thereby making it possible to increase precision. However, if a torque due to torsion of the suspension wire 57 increases to such an extent that it cannot be neglected, its influence appears. FIGURE 4 another integral torque generator U in which a float 59 is provided at the lower end of a shaft 50 so as not to produce a torsional torque in the bearings and the float 59 is floated by a liquid 60 inside a vessel 58 attached to a base plate 45. Also in this case, friction between bearings 48 and 49 can be decreased. Furthermore, the damper 53, the box 54 and the liquid 55 in FIGURE 2 can be dispensed with by the use of a highly viscous liquid as the liquid 60.

Figure 5:
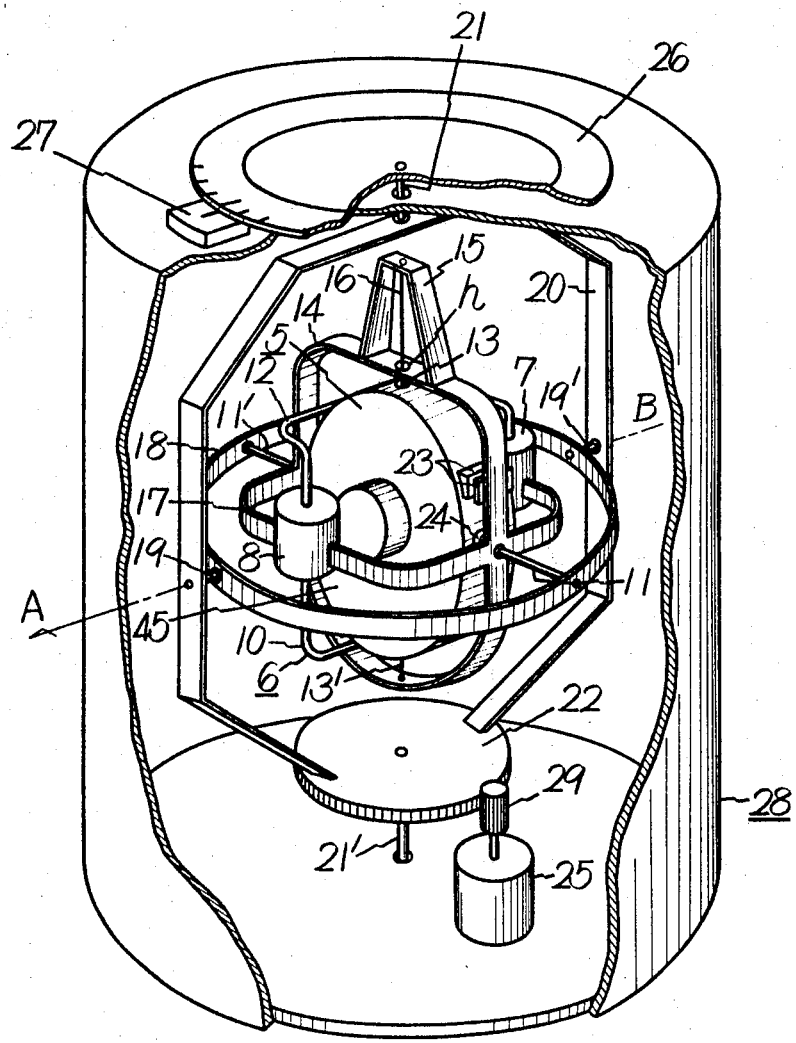
FIGURE 5 is a perspective view schematically illustrating an embodiment of the gyrocompass having one portion removed.

FIGURE 5 illustrates, by way of example, a gyrocompass to which an integral torque generator U of the present invention is applied and which is shown simple in structure for explaining the principle of this invention. A gyro case 5 similarly including a rotor therein has vertical shafts 13 and 13', which are supported to a vertical ring 14 by means of ball bearings not shown in the figure. The vertical ring 14 is in turn supported to a horizontal ring 18 by horizontal shafts 11 and 11' through ball bearings not shown. Furthermore, the horizontal ring 18 is supported to a follower ring 20 by shafts 19 and 19' through ball bearings not shown. This follower ring 20 is supported to a case 28 by shafts 21 and 21'. The vertical ring 14 has a support base 15, from which the vertical shaft 13 is suspended by a suspension wire 16, so that the weight of the gyro case 5 does not render any load to the vertical shaft bearings. To the vertical ring 14, a ballistic 6 including pots 7 and 8 and a communication pipe 10 for interconnecting the pots is fixed by a support arm 17. The pots 7 and 8 have an air pipe 12 and a non-contact pick-off 23 is provided between the vertical ring 14 and the gyro case 5 to detect relative displacement between the ring 14 and the gyro case 5, forming a servo loop through an amplifier (not shown), a servo motor 25, toothed wheels 29 and 22 and through the follower ring 20 and the horizontal ring 18 connected to the toothed wheel 22. As a result of this, the gyro case 5 and the vertical ring 14 are always in motion together and controlled by the servo system so that no displacement may be caused therebetween. Thus, the azimuth of the spin axis can be read out from a dial card 26 attached to the shaft 21 with respect to an index 27.

In this case, the gyro case 5 and the ballistic 6 are put in the same state around the horizontal shaft 11 as in FIGURE 3. A damping system is formed by a counter-weight 24. That is, the counter-weight 24 is mounted on the west side of the gyro case 5 and produces a torque around the vertical shafts 13 and 13' in proportion to inclination of the gyro case, which acts as a damping action as has been well known. In FIGURE 5, the gyro faces toward the south and rotates in the clockwise direction.

In FIGURE 5, the integral torque generator U such as described in FIGURE 2 is not shown but can be mounted on the gyro in such a manner that the axis X—X in FIGURE 2 is in parallel with the horizontal shafts 11 and 11', for example, the base plate 45 is fixed to a plate 45' of the gyro case 5. In this case, the integral torque generator U can move about the horizontal shafts 11 and 11' integrally with the ballistic 6 and the gyro case 5 so that transfe of the center of gravity of the integral torque generator U acts on the gyro as a torque about the horizontal shaft 11. In this case, each element of the integral torque generator is so selected that the torque due to the integral torque generator is sufficiently smaller than that produced by the ballistic 6, the spin axis of this gyro moves to rest toward substantially the north as shown by the curve in FIGURE 1 owing to the action of the ballistic 6 and a damping device not shown. In the northern hemisphere, however, the spin axis A–B cannot rest unless it inclines with its north side a little higher. Accordingly, when the gyro-spin axis is about to rest substantially toward the north the spin axis always comes to be in a condition that its north side is higher than the south side. That is, since the spin axis moves in the same manner as the curve in FIGURE 1, when the motion draws to a standstill the part including elements 51, 52 and 53 of the integral torque generator U gradually and accurately rotates around the shaft 50 and transfer of the center of gravity of the integral torque generator U produces a torque which gradually pushes down the south side of the gyro toward the direction of gravity. Thus the gyro comes down to the north and continues the north-seeking action so that the torque of the integral torque generator U may be eliminated by a torque produced by the ballistic 6. Thus, a stable stationary point of this gyro is inevitably determined in the following manner. That is, the stable point is such that the torque of the integral torque generator U is constant and a difference between this torque and that of the ballistic 6 remains as a constant torque around the horizontal shaft 11 and precession caused by the resultant torque coincides with the rotary component around the vertical axis of the surface of the earth at the place where the gyro is located. In other words, the position that the torque of the integral torque generator U becomes constant is a position that the spin axis stays horizontal. In such a case, the liquid of the ballistic 6 is kept in an equilibrium in the pots 7 and 8 and a torque of the ballistic 6 is zero. Thus, by the use of the integral torque generator U the stationary point of the gyro-spin axis is correctly horizontal, so that the torque around the vertical axis produced by the damping system is also zero at the stationary point and therefore no latitudinal errors are produced. That is, the north-seeking action of the gyrocompass using an integral torque generator which corresponds to that in FIGURE 1 is as illustrated by the curves $a'$ and $b'$ in FIGURE 4 corresponding to those in FIGURE 1.

Many other kinds of integral torque generators may be used without being limited to those shown in FIGURES 2, 3 and 4.

According to the present invention, the integral torque generator U which causes transfer of the center of gravity in proportion to an integrated value of inclination is attached to a sensitive element of a gyrocompass whereby no latitudinal errors are caused and gyrocompasses of high precision can be manufactured at a low price. Consequently the present invention is very valuable for practical use in the operation of ships.

The gyrocompasses to which this invention can be applied are well-known ones of the same kind without being restricted to that shown in FIGURE 5. As to the ballistic, not only mercury and liquid type ones but also the so-called top-heavy type ones using viscosity and a pendulum can be employed.

The damping device of this invention can also be applied not only to the damping weight system shown in FIGURE 5 but also to an easterly eccentric pivot system, an air control system or the like such that a torque is applied to the vertical shaft to effect damping. The gyro supporting system can also be applied to other ones. Since these well-known gyrocompasses are not related directly to the present invention, explanations thereon are omitted from the specification. However, it will be seen that so far as this invention can be applied to them, they fall within the scope of the present invention.

It will be apparent that many modifications and variations may be effected without departing from the scope of the novel concept of this invention.

I claim as my invention:

1. A gyrocompass comprising a case, a rotor mounted in said case for rotating about a first horizontal axis, a support member including means connected to said case and providing an axis of rotation of said case and said rotor mounted therein along a second horizontal axis which is perpendicular to said first horizontal axis, said case having a vertical axis passing therethrough and intersecting said first and second horizontal axes at right angles thereto, and an integral torque generator secured to a part, said integral torque generator and said part being moved with said case and said rotor about said second axis to produce a torque with respect to time to eliminate the effects of latitudinal error which is caused by the earth rotation, said integral torque generator including a vertical shaft rotatably around its axis, a support arm one end of which is secured to said vertical shaft, a weight attached to said support arm and a damper means for damping the movement of said weight.

2. A gyrocompass comprising a case, a rotor mounted in said case for rotating about a first horizontal axis, a support member including means connected to said case and providing an axis of rotation of said case and said rotor mounted therein along a second horizontal axis which is perpendicular to said first horizontal axis, said case having a vertical axis passing therethrough and intersecting said first and second horizontal axes at right angles thereto, and an integral torque generator secured to a part, said integral torque generator and said part being moved with said case and said rotor about said second axis to produce a torque with respect to time to eliminate the effects of latitudinal error which is caused by the earth rotation, said integral torque generator including a base plate, a vertical shaft rotatably supported on said base plate, a support arm one end of which is attached to said vertical shaft, a weight fixed to the other end of said support arm and a damper having a rod one end of which is attached to said support arm the other end of which forms a comb and a vessel containing a liquid therein, said comb being immersed into said liquid.

3. A gyro compass as clamed in claim 2, wherein said vertical shaft is journalled by ball bearings and the upper end of said vertical shaft is connected to a suspension wire against the thrust of said vertical shaft.

4. A gyrocompass as claimed in claim 2, wherein a float is attached to the lower end of said vertical shaft and a vessel containing a liquid therein is fixed to said base plate, said float being immersed in said liquid against the thrust of said vertical shaft.

References Cited

UNITED STATES PATENTS

| | | |
|---|---|---|
| 1,777,958 | 10/1930 | Brown. |
| 1,805,854 | 5/1931 | Sperry. |
| 1,866,706 | 7/1932 | Henderson. |
| 1,923,885 | 8/1933 | Rawlings. |
| 2,249,345 | 7/1941 | Braddon. |
| 3,212,196 | 10/1965 | Carter. |

WILLIAM D. MARTIN, JR., *Primary Examiner.*

U.S. Cl. X.R.

33—220